United States Patent
Hmimy

(10) Patent No.: US 11,671,848 B2
(45) Date of Patent: Jun. 6, 2023

(54) DYNAMIC CONFIGURATION AND USE OF WIRELESS BASE STATIONS IN A NETWORK

(71) Applicant: Charter Communications Operating, LLC, St. Louis, MO (US)

(72) Inventor: Hossam H. Hmimy, Aurora, CO (US)

(73) Assignee: Charter Communications Operating, LLC, St. Louis, MO (US)

(\*) Notice: Subject to any disclaimer, the term of this patent is extended or adjusted under 35 U.S.C. 154(b) by 0 days.

(21) Appl. No.: 17/203,509

(22) Filed: Mar. 16, 2021

(65) Prior Publication Data

US 2021/0211892 A1 Jul. 8, 2021

Related U.S. Application Data

(63) Continuation of application No. 15/942,892, filed on Apr. 2, 2018, now Pat. No. 10,979,911.

(51) Int. Cl.
*H04W 16/28* (2009.01)
*H04W 16/18* (2009.01)
*H04W 84/04* (2009.01)
*H04W 16/10* (2009.01)
*H04W 16/24* (2009.01)

(52) U.S. Cl.
CPC .......... *H04W 16/28* (2013.01); *H04W 16/10* (2013.01); *H04W 16/18* (2013.01); *H04W 84/042* (2013.01); *H04W 16/24* (2013.01)

(58) Field of Classification Search
CPC ................ H04W 16/18; H04W 16/20; H04W 16/28–32; H04W 84/042; H04W 84/045; H04W 84/047; H04W 88/08–18
See application file for complete search history.

(56) References Cited

U.S. PATENT DOCUMENTS

| 8,010,116 B2 | 8/2011 | Scheinert |
| 9,263,803 B1 | 2/2016 | Weller et al. |
| 9,711,849 B1 | 7/2017 | Chen et al. |
| 9,912,079 B2 | 3/2018 | Hartenstein et al. |
| 2003/0002458 A1 | 1/2003 | Bernheim |

(Continued)

*Primary Examiner* — San Htun
(74) *Attorney, Agent, or Firm* — Armis IP Law, LLC

(57) ABSTRACT

According to one configuration, a wireless communication system includes antenna hardware, radio communication hardware, and a controller. The controller defines wireless sectors of coverage and configures them dynamically depending on network conditions. The radio communication hardware is coupled to the antenna hardware. The antenna hardware includes multiple antenna elements to wirelessly communicate in a network environment. During operation, the controller generates configuration settings to control a configuration of the radio communication hardware and the antenna hardware. The controller applies the configuration settings to the radio communication hardware to define corresponding wireless coverage provided by one or more software defined sectors in multiple base stations in a network environment. The one or more instantiated base stations (as indicated by the configuration settings) provide multiple communication devices in the network environment access to a remote network such as the Internet.

19 Claims, 11 Drawing Sheets

(56) References Cited

U.S. PATENT DOCUMENTS

| | | | |
|---|---|---|---|
| 2008/0204318 A1* | 8/2008 | Thomas | H01Q 21/24 |
| | | | 342/361 |
| 2009/0023477 A1* | 1/2009 | Staudte | H04W 16/28 |
| | | | 455/562.1 |
| 2012/0184268 A1 | 7/2012 | Sabat et al. | |
| 2013/0120191 A1* | 5/2013 | Zhang | H04B 7/088 |
| | | | 455/562.1 |
| 2013/0157660 A1 | 6/2013 | Awad et al. | |
| 2013/0307752 A1 | 11/2013 | Johansson et al. | |
| 2014/0036770 A1* | 2/2014 | Stapleton | H04W 72/0453 |
| | | | 370/328 |

* cited by examiner

| BASE STATION | ANTENNA INTERFACE | ANTENNA ELEMENTS | WIRELESS COVERAGE REGION | SECTOR COVERAGE ANGLE | POWER LEVEL (% of MAX) |
|---|---|---|---|---|---|
| 120-1 | 132-1 | A12, A13, A14, A15 | 160-1 | 0-180 deg | 100% |
| 120-2 | 132-2 | A51, A61, A62 | 160-2 | 180-270 deg | 100% |
| 120-3 | 132-3 | A56, A65, A66 | 160-3 | 270-360 deg | 75% |

CONFIGN. SETTINGS 110-1

FIG. 2

| BASE STATION | ANTENNA INTERFACE | ANTENNA ELEMENTS | WIRELESS COVERAGE REGION | SECTOR COVERAGE ANGLE | POWER LEVEL (% of MAX) |
|---|---|---|---|---|---|
| 120-4 | 132-4 | A15, A16, A26 | 160-4 | 0-90 deg | 100% |
| 120-2 | 132-2 | A51, A61, A62 | 160-2 | 180-270 deg | 100% |
| 120-3 | 132-3 | A56, A65, A66 | 160-3 | 270-360 deg | 55% |
| 120-5 | 132-5 | A11, A12, A21 | 160-5 | 90-180 deg | 100% |

CONFIGN. SETTINGS 110-2

FIG. 4

| BASE STATION | ANTENNA INTERFACE | ANTENNA ELEMENTS | WIRELESS COVERAGE REGION | SECTOR COVERAGE ANGLE | POWER LEVEL (% of MAX) |
|---|---|---|---|---|---|
| 120-4 | 132-4 | A15, A16, A26 | 160-4 | 0-90 deg | 100% |
| 120-3 | 132-3 | A56, A65, A66 | 160-3 | 270-360 deg | 75% |
| 120-6 | 132-6 | A21, A31, A41, A51 | 160-6 | 90-270 deg | 100% |

CONFIGN. SETTINGS 110-3

FIG. 6

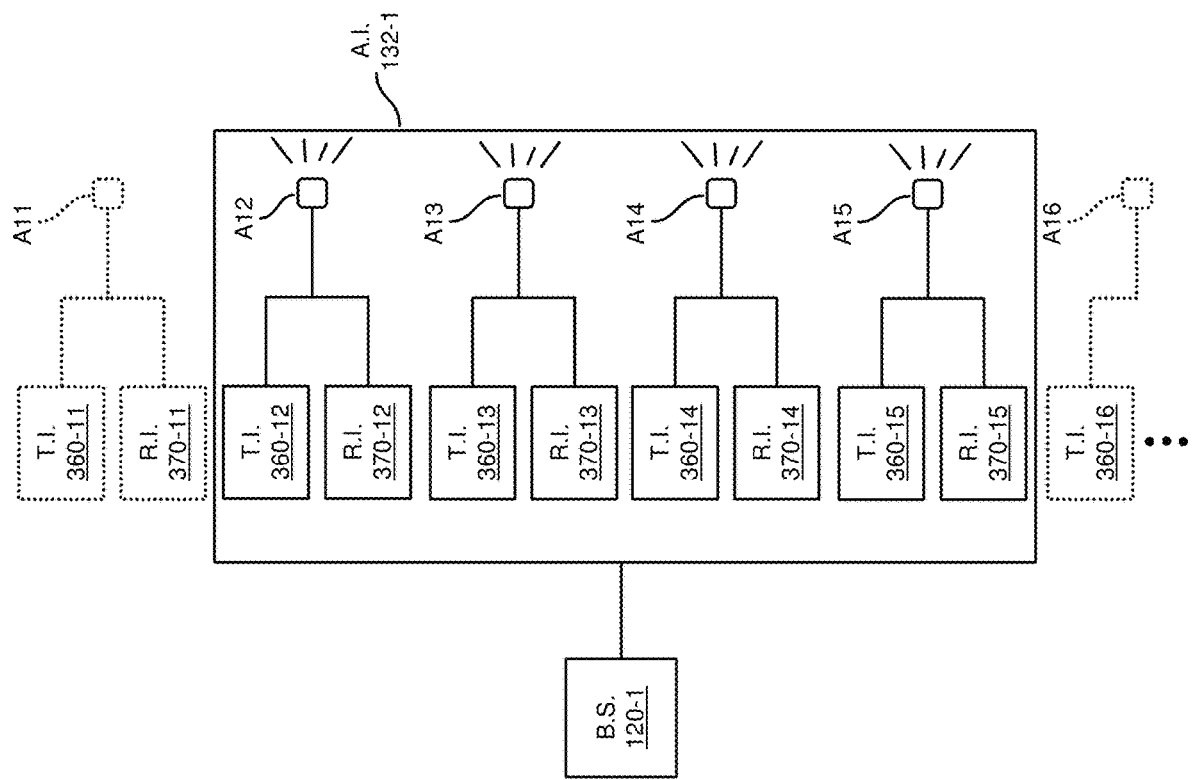

DYNAMIC CONFIGURATION AND USE OF WIRELESS BASE STATIONS IN A NETWORK

RELATED APPLICATION

This application is a continuation application of earlier filed U.S. patent application Ser. No. 15/942,892 entitled "DYNAMIC CONFIGURATION AND USE OF WIRELESS BASE STATIONS IN A NETWORK," filed on Apr. 2, 2018, the entire teachings of which are incorporated herein by this reference.

BACKGROUND

Conventional wireless networks typically include one or more wireless base stations to provide mobile communication devices access to a remote network such as the Internet. During operation, conventional base stations are configured to provide wireless coverage in an allocated portion of a geographical region.

For example, a first base station in a wireless communication system can be physically configured to provide wireless coverage between a 0 to 70 degree sector; a second (sector) base station in the wireless communication system can be configured to provide wireless coverage (sector) in a 70 to 160 degree sector; and so on.

In such an instance, antenna hardware associated with the first base station is physically mounted in an appropriate manner to provide wireless coverage between 0 and 70 degrees in the geographical region; antenna hardware associated with the second base station is physically mounted in an appropriate manner to provide wireless coverage between 70 and 160 degrees in the geographical region; and so on.

In this manner, multiple base stations can be configured to provide coverage in a particular geographical region.

BRIEF DESCRIPTION OF EMBODIMENTS

There are deficiencies associated with conventional techniques of providing wireless connectivity to users. For example, each conventional base station is typically implemented to support wireless communications in a predetermined, fixed region. In order to change coverage of a wireless access point, the base station and/or a respective antenna device must be physically modified to cover the newly allocated wireless region. It is a time-consuming endeavor to re-design and physically install updated base stations and antenna devices to accommodate ever-changing network conditions.

Additionally, according to strict implementation standards and use of available wireless frequencies, each wireless access point is able to provide limited wireless output power. This disclosure further includes the observation that if the coverage region supported by a respective wireless access point is large, the effective wireless power to communicate with communication devices is quite limited when implementing an omni-directional antenna.

Embodiments herein provide novel ways of providing improved wireless communications to one or more mobile communication devices. Certain embodiments herein include dynamic configuration of software-defined sectors of wireless base stations in a network environment.

More specifically, a communications system includes base station controller hardware, radio communication hardware, and antenna hardware to communicate with one or more communication devices in a network environment. In one embodiment, the base station controller is instantiated in the radio communication hardware. To support communications, the base station controller hardware generates configuration settings to control the radio communication hardware coupled to the antenna hardware. In one embodiment, the configuration settings indicate one or more (virtual) base stations to be instantiated by the radio communication hardware. The antenna hardware includes multiple antenna elements to wirelessly communicate (transmit and receive wireless signals) in the network environment. The base station controller hardware applies the configuration settings to the configurable radio communication hardware to define corresponding wireless coverage (such as angle of coverage, communication range with respect to a base station, etc.) to be provided by each of multiple base stations in a network environment. In one embodiment, each corresponding region of wireless coverage is a software defined sector.

Subsequent to being instantiated, the multiple base stations (as configured by the base station controller hardware) provide multiple communication devices in the network environment access to a remote network.

In one embodiment, in addition to defining the one or more base stations in a network environment, the base station controller hardware produces the configuration settings to indicate a respective grouping of the antenna elements assigned for use by each of the multiple base stations. In accordance with the configuration settings, the radio communication hardware provides connectivity between the (virtual) base stations and respective groupings of antenna elements.

The configuration settings are adjustable to redefine base stations and corresponding wireless coverage in the wireless network environment. Accordingly, one embodiment herein includes modifying the configuration settings (number of base stations and corresponding wireless coverage) depending on network conditions.

If desired, at least portions of the wireless coverage provided by the multiple base stations as defined by the configuration settings are non-overlapping with respect to each other. For example, the base station controller hardware controls a first wireless base station to provide wireless coverage in a first region; the base station controller controls a second wireless base station to provide wireless coverage in a second region; the base station controller hardware controls a third wireless base station to provide wireless coverage in a third region; so on.

In accordance with further embodiments, the base station controller hardware generates the configuration settings to define attributes of the multiple base stations and corresponding wireless coverage depending on locations of multiple communication devices in the network environment. For example, the base station controller hardware can be configured to define the number of different base station regions depending on one or more attributes such as a number of communication devices to be serviced, density of communication devices in each of multiple regions to be serviced, wireless bandwidth requirements of the communication devices, locations of the mobile communication devices, etc.

To generate configuration settings, the base station controller hardware further performs operations of: selecting a first grouping of antenna elements from the antenna hardware to provide connectivity to communication devices in a first wireless coverage region in the network environment; assigning the first grouping of antenna elements to a first base station of the radio communication hardware that uses the first grouping of antenna elements to communicate with the communication devices in the first wireless coverage region; selecting a second grouping of antenna elements from the antenna hardware to provide connectivity to communication devices in a second wireless coverage region in the network environment; and assigning the second grouping of antenna elements to a second base station of the radio communication hardware.

The base station controller hardware then applies the configuration settings to the radio communication hardware to provide the assigned coverage. As previously discussed, the configuration settings define connectivity between the base station controller hardware and groupings of antenna elements. In one embodiment, the base station controller hardware: i) applies the configuration settings to the radio communication hardware to provide connectivity between the first base station and the first grouping of antenna elements; and ii) applies the configuration settings to the radio communication hardware to provide connectivity between the second base station and the second grouping of antenna elements. In this manner, the base station controller hardware can be configured to provide dynamic connectivity to multiple communication devices in a network environment depending on network conditions. As previously discussed, portions of the first wireless coverage region and the second wireless coverage region can be non-overlapping with respect to each other.

In addition to selecting configuration settings and different regions of wireless coverage, the base station controller hardware as discussed herein can be configured to select additional operating parameters such as one or more carrier frequencies to be used by each of the instantiated base stations. For example, in one embodiment, the base station controller hardware instantiates a first (virtual) base station in the radio communication hardware to wirelessly communicate from a first group of the antenna elements over a first group of one or more carrier frequencies; the base station controller hardware operates a second (virtual) base station of the multiple wireless base stations to wirelessly communicate from a second group of the antenna elements over a second group of one or more carrier frequencies; and so on. In one embodiment, there is no common frequency present in both the first group of carrier frequencies and the second group of carrier frequencies. In other words, if desired, the carrier frequency use among base stations is non-overlapping.

In accordance with alternative embodiments, the different base stations can be configured to share use of one or more carrier frequencies.

As previously discussed, conditions of a respective network environment can change over time. In accordance with further embodiments, to accommodate ever-changing network environment conditions (such as change in number of users, change in density of user sin a wireless region, bandwidth requirements, etc.), the base station controller hardware redefines use of the radio communication hardware and antenna hardware to provide different wireless coverage in the network environment depending on the network conditions. Thus, via the base station controller hardware, embodiments herein include: dynamically adjusting the configuration settings applied to the radio communication hardware to change a number of the multiple base stations instantiated by the radio communication hardware over time.

In accordance with still further embodiments, operations of generating configuration settings to control the radio communication hardware can include: i) producing the configuration settings to indicate a first portion of the antenna elements assigned to a first base station of multiple base stations instantiated by the base station controller hardware, ii) producing the configuration settings to indicate a second portion of the antenna elements assigned to a second base station of the multiple base stations instantiated by the base station controller hardware, and so on.

Further embodiments herein include controlling the first portion of the antenna elements assigned to the first instantiated base station to transmit at a same maximum wireless power level as the second portion of the antenna elements assigned to the second instantiated base station. Thus, instantiation of more base stations enables the radio communication hardware to transmit communications at an overall higher power density in the region.

In accordance with further embodiments, the base station controller hardware is operable to produce first configuration information to define a first grouping of base stations and corresponding first wireless coverage, the first configuration settings indicating different groupings of antenna elements selected from available antenna hardware to provide first wireless services; apply the first configuration information to the antenna hardware to provide the first wireless services in the wireless network environment; detect a change in network conditions; produce second configuration information to define a second grouping of base stations and corresponding second wireless coverage, the second configuration settings indicating different groupings of antenna elements selected from the available antenna hardware to provide second wireless services; and apply the second configuration information to the antenna hardware to provide the second wireless services in the network environment.

In one embodiment, the first grouping of base stations specifies a different number of base stations than the second grouping of base stations.

In accordance with further embodiments, the first wireless coverage is different than the second wireless coverage.

Yet further embodiments herein include detecting an increased number of mobile communication devices in a wireless network environment and producing the second configuration information to accommodate the increased number of mobile communication devices. Further embodiments herein can include detecting a decreased number of mobile communication devices in a wireless network environment and producing the second configuration information to accommodate the decreased number of mobile communication devices.

In accordance with still further embodiments, the antenna hardware is disposed at a single, central location in the wireless network environment.

Embodiments herein are useful over conventional techniques. For example, as previously discussed, the dynamic configuration of radio communication hardware and corresponding antenna hardware provide more efficient use of wireless resources in a network environment.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate dynamic implementation of base stations. The instructions, when executed by computer processor hardware, cause the computer processor hardware (such as one or more co-located or disparately processor devices) to: generate configuration settings to control radio communication hardware coupled to antenna hardware, the antenna hardware including multiple antenna elements to wirelessly communicate in a network environment; apply the configuration settings to the radio communication hardware to define corresponding wireless coverage provided by multiple base stations in a network environment; and via the multiple base stations, provide multiple communication devices in the network environment access to a remote network.

Another embodiment includes a computer readable storage medium and/or system having instructions stored thereon to facilitate dynamic implementation of base stations. The instructions, when executed by computer processor hardware, cause the computer processor hardware (such as one or more co-located or disparately processor devices) to: produce first configuration information to define a first grouping of base stations and corresponding first wireless coverage, the first configuration settings indicating different groupings of antenna elements selected from available antenna hardware to provide first wireless services; apply the first configuration information to the antenna hardware to provide first wireless services in a wireless network environment; detect a change in network conditions; produce second configuration information to define a second grouping of base stations and corresponding second wireless coverage, the second configuration settings indicating different groupings of antenna elements selected from the available antenna hardware to provide second first wireless services; and apply the second configuration information to the antenna hardware to provide the second wireless services in the network environment. The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating generation of first configuration settings according to embodiments herein.

FIG. 4 is an example diagram illustrating generation of second configuration settings according to embodiments herein.

FIG. 6 is an example diagram illustrating generation of third configuration settings according to embodiments herein.

FIG. 11 is an example diagram illustrating an transceiver interface according to embodiments herein. The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a wireless communication system includes antenna hardware, radio communication hardware, and a controller. The controller defines the wireless sectors and configures them dynamically depending on network conditions. The radio communication hardware is coupled to the antenna hardware. The antenna hardware includes multiple antenna elements to wirelessly communicate in a network environment. During operation, the controller generates configuration settings to control a configuration of the radio communication hardware and the antenna hardware. The controller applies the configuration settings to the radio communication hardware to define corresponding wireless coverage provided by one or more software defined sectors in a network environment via instantiated multiple base station. The one or more instantiated base stations (as indicated by the configuration settings) provide multiple communication devices in the network environment access to a remote network such as the Internet.

Figure 1:
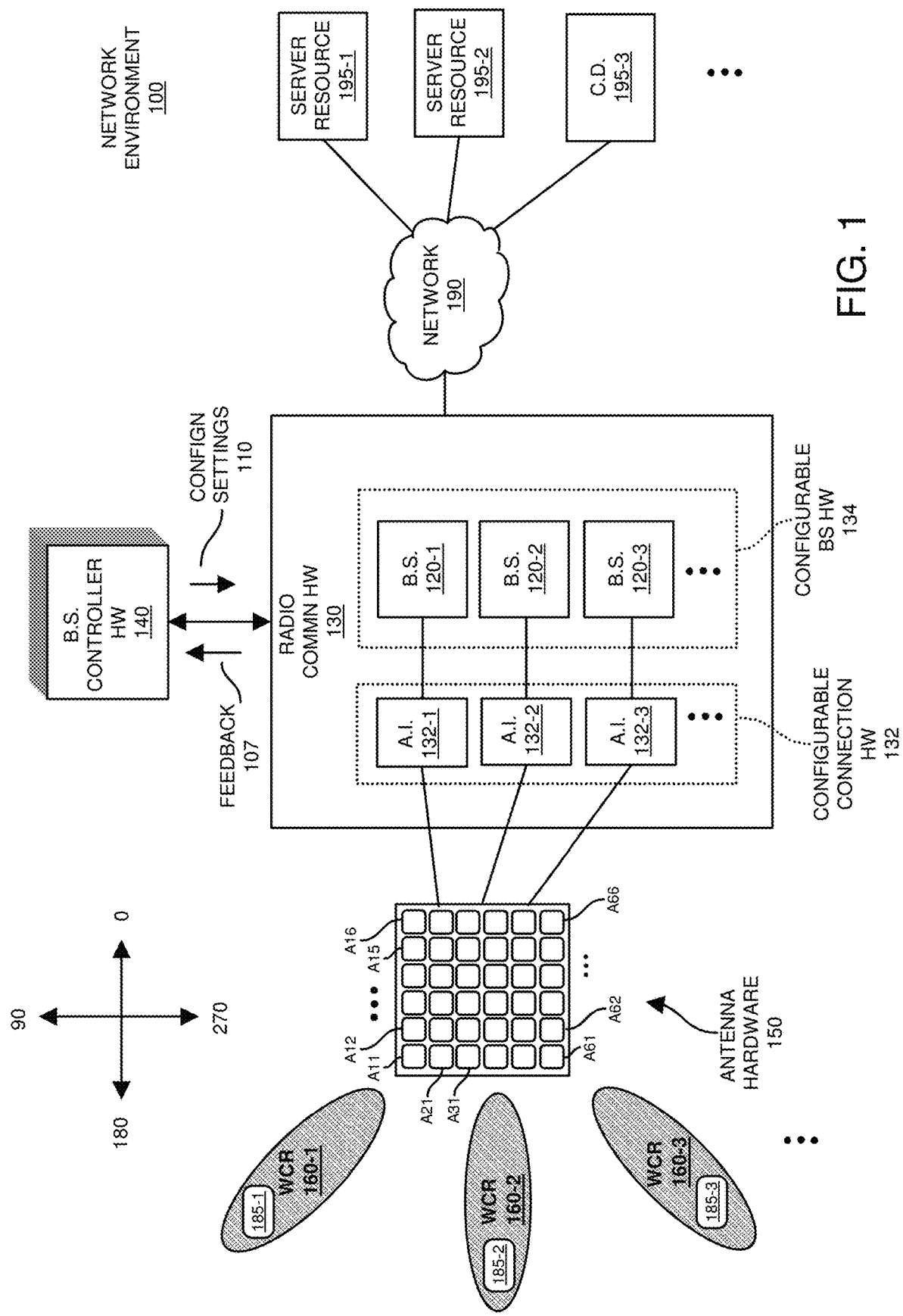
FIG. 1 is an example diagram illustrating a wireless network environment and dynamic operation of same according to embodiments herein.

Now, more specifically, FIG. 1 is an example diagram illustrating a wireless network environment and dynamic implementation of different base station configurations according to embodiments herein.

In this example embodiment, the communication system in network environment 100 includes base station controller hardware 140, radio communication hardware 130, and antenna hardware 150 to support wireless communications with one or more communication devices (e.g., handheld mobile communication devices, fixed dish antenna communication devices, etc.) in network environment 100.

As further discussed below, each of the base station controller hardware 140, radio communication hardware 130, etc., executes software instructions to carry different functions.

Note that, in one embodiment, the controller hardware 140 is instantiated in the radio communication hardware 130 or separate dedicated radio communication hardware.

Antenna hardware 150 can be configured to include multiple antenna elements A11, A12, A13, . . . , A21, A22, A23, . . . , A61, A62, A63, A64, A65, and A66 to support bi-directional communications in any angular direction.

In the present example, the antenna hardware 150 includes a 6×6 array of antenna elements. Note that use of a 6×6 array of antenna elements are shown by way of non-limiting example only. The antenna hardware 150 can include any sized array of antenna elements.

In one embodiment, the antenna hardware 150 is configured as a panel of antenna elements.

Each antenna element Axy (where x=row, y=column) in the antenna hardware 130 is capable of transmitting and receiving wireless signals. As further discussed below, different groupings of antenna elements can be assigned to provide different angular regions of wireless coverage (a.k.a., sectors) in a respective wireless network.

In one embodiment, the antenna hardware 130 is disposed at a single, central location in the wireless network environment. The antenna hardware 130 supports transmission and receipt of wireless communications in any angular direction. As further discussed below, different groupings of the antenna elements support different configurations of wireless coverage. Desired directivity and wireless coverage associated with a base station is achieved by combining elements in an assigned antenna array (of antenna elements) in such a way that emitted wireless signals at particular angles experience constructive interference while others experience destructive interference. Beamforming can be used at both the transmitting and receiving ends in order to achieve spatial selectivity.

In accordance with further embodiments, radio communication hardware 130 includes configurable connection hardware 132 and configurable base station hardware 134.

The ability to configure the radio communication hardware 130 and antenna hardware 150 enables the base station controller hardware 140 to adjust wireless services (such as size and number of regions of wireless coverage) without having to physically adjust the antenna elements and/or base station hardware as is required by conventional communication systems. If a current implementation of multiple base stations does not provide appropriate services to mobile communication devices, the base station controller hardware 140 appropriately modifies the configuration settings 110 to correct any shortcomings.

In this example embodiment, the configurable base station hardware 134 includes any suitable resources such as computer processor hardware, data storage hardware, applications, software instructions, etc., in which to implement any of one or more (virtual) base stations 120 and corresponding functionality.

Each base station can be configured to operate independently of the other base stations 120. As further discussed herein, each base station can be assigned any number of antenna elements associated with antenna hardware 150 in order to provide desired wireless connectivity (transmit and receive capability) to respective users in a defined region of wireless coverage. Each instantiated base station can be configured to provide wireless connectivity via one or more dynamic sectors of wireless coverage.

As its name suggests, the configurable connection hardware 132 provides configurable connectivity between the virtual base stations and the antenna hardware 150. More specifically, as discussed herein, each base station is assigned one or more antenna elements for use to transmit and/or receive wireless communications from one or more communication devices.

To support wireless communications, the base station controller hardware generates configuration settings 110 to control settings of the radio communication hardware 130 coupled to the antenna hardware 150. In one embodiment, the configuration settings 110 indicate one or more (virtual) base stations to be instantiated by the radio communication hardware 130.

As previously discussed, the antenna hardware 150 includes multiple antenna elements to wirelessly communicate (transmit and receive wireless signals) in the network environment 100. The base station controller hardware 140 applies the configuration settings 110 to the configurable radio communication hardware to define corresponding wireless coverage (such as angle of coverage, communication range/distance with respect to a antenna hardware/base station, etc.) to be provided by each of multiple base stations in the network environment 100.

Subsequent to being instantiated, the multiple base stations (as configured by the base station controller hardware) provide different groupings of one or more communication devices in the network environment access to a remote network 190 such as the Internet, cellular network, etc.

For example, via upstream communications, the mobile communication devices communicate with a respective base station. The base station forwards the communications upstream through network 190 to a target destination such as server resource 195-1, server resource 195-2, communication device 195-, etc.

In a reverse direction (downstream direction), the base station receives communications directed to a respective communication device from server resource 195-1, server resource 195-2, communication device 195-3, etc. The base station forwards the communications over a wireless link to a respective destination communication device.

In one embodiment, in addition to defining the one or more base stations 120 to be implemented by the radio communication hardware 130, the base station controller hardware 140 produces the configuration settings 110 to indicate a respective grouping of the antenna elements in antenna hardware 150 assigned for use by each of the multiple base stations 120. In accordance with the configuration settings 110, the configurable connection hardware 132 provides connectivity between the (virtual) base stations and respective groupings of antenna elements. As previously discussed, and as its name suggests, the settings of the configurable connection hardware 132 can be selected to connect a respective base station to any of one or more antenna elements associated with antenna hardware 150.

As further discussed herein, the configuration settings 110 are adjustable over time to redefine base stations 120 instantiated by the configurable base station hardware 134 and corresponding provided wireless coverage in the wireless network environment 100. Accordingly, one embodiment herein includes modifying the configuration settings 110 (such as number of base stations and corresponding wireless coverage) depending on network conditions.

In one embodiment, the base station controller 140 receives feedback 107 from one or more resources such as base stations 120, communication devices, etc. The feedback 107 can indicate any suitable information such as the number of mobile communication devices serviced in a respective wireless coverage region, number of communication devices serviced by a respective base station, locations of communication devices, etc.

Based on the feedback, and detected changing network conditions, the base station controller hardware 140 updates the configuration settings 110 to provide efficient use of wireless resources (such as bandwidth) in the network environment 100.

The base stations can be configured to support different types of communications such as LTE communications, WiFi™ communications, etc.

In one embodiment, each of the base stations 120 supports communication over the CRBS (Citizen Radio Band Service) such as in the 3.5 GHz band (around 3550-3700 MHz). In such an instance, each base station is assigned a corresponding CBRS identifier value. The band can be configured to support different carrier frequencies; each base station is assigned one or more of the carrier frequencies in the band to support wireless communications.

In accordance with still further embodiments, each base station can be configured to transmit wireless communications up to a maximum allowed EIRP (Effective Isotropic Radio Power) level for the given band. Increasing the number of instantiated base stations allows for an increased amount of wireless power to communicate in a given region serviced by the antenna hardware 150. For example, each instantiated base station can be configured to transmit at a same, maximum wireless power level as the second portion of the antenna elements assigned to the second instantiated base station. Thus, instantiation of more base stations enables the radio communication hardware to transmit communications at an overall higher power density in the region.

If desired, at least portions of the wireless coverage (as indicated by wireless coverage regions 160) provided by the multiple base stations 120 as defined by the configuration settings 110 are non-overlapping with respect to each other. For example, the base station controller hardware 140 can be configured to define a first wireless base station 120-1 to provide wireless connectivity to a first group of communication devices 185-1 in a first wireless coverage region 160-1 such as in an angular range between 0-100 degrees; the base station controller hardware 140 can be configured to define a second wireless base station 120-2 to provide wireless connectivity to a second group of communication devices 185-2 in the second wireless coverage region 160-2 such as in an angular range between 80-190 degrees; the base station controller hardware 140 can be configured to define a third wireless base station 120-3 to provide wireless connectivity to a third group of communication devices 185-3 in a third wireless coverage region 160-3 such as in an angular range between 170-280 degrees; so on.

In such an instance, either of the base station 120-1 and base station 120-2 in the above example can be configured to provide connectivity to mobile communication devices in the angular range between 80 and 100 degrees; either of the base station 120-2 and base station 120-3 in the above example can be configured to provide connectivity to mobile communication devices in the angular range between 170 and 190 degrees; and so on.

In accordance with further embodiments, the base station controller hardware 140 generates the configuration settings 110 to define attributes of the multiple base stations and corresponding wireless coverage depending on locations and/or wireless usage associated with multiple communication devices in the network environment. For example, the base station controller hardware 140 can be configured to define the number of different base station regions instantiated by the configurable base station hardware 134 and connectivity provided by configurable connection hardware 132 of radio communication harder 130 depending on one or more attributes such as a number of communication devices to be serviced, density of communication devices in each of multiple regions to be provided wireless service, locations of communication devices, bandwidth requirements of the communication devices, etc.

FIG. 2 is an example diagram illustrating generation of first configuration settings according to embodiments herein.

At or around time T1, the base station controller hardware 140 generates configuration settings 110-1 to provide first wireless services to multiple (stationary or mobile) communication devices present in network environment 100.

For example, in one embodiment, prior to generating configuration settings 110-1, the base station controller hardware 140 determines how many base stations to instantiate in network environment 100. In this example embodiment, assume that the base station controller hardware 140 produces the configuration settings 110-1 to support three base stations, namely, base station 120-1, 120-2, and 120-3.

The number of base stations instantiated by the base station controller hardware 140 depends on factors such as number of communication devices in a wireless region, bandwidth to be provided to the communication devices, amount of interference, etc.

For each base station to be instantiated, the base station controller 140 selects an appropriate grouping of antenna elements in antenna hardware 150 to provide a corresponding group of communication devices connectivity to a remote network 190. The antenna elements in antenna hardware 150 are located at different physical position in an array. Controlling phases of driving an assigned grouping of antenna elements and controlling phases of received signs from the antenna elements enables a respective base station to transmit and receive wireless communications in a particular wireless coverage region.

More specifically, in this example embodiment, the base station controller 140 selects a first grouping of antenna elements A12, A13, A14, and A15 from the antenna hardware 150 to provide wireless connectivity to communication devices 385-1 in a first wireless coverage region 160-1 in the network environment 100; the base station controller hardware 140 assigns the first grouping of antenna elements A12, A13, A14, and A15 and corresponding antenna interface 132-1 to first base station 120-1 to enable the base station 120-1 to communicate with the communication devices 385-1 in the first wireless coverage region 160-1 (first sector). In other words, the grouping of antenna elements is specifically chosen to provide a desired wireless coverage pattern.

Instantiation of the antenna interface 132-1 and its corresponding attributes (such as one or more resources in radio communication hardware 130) as specified by the base station controller hardware 140 provides hardware connectivity between the instantiated base station 120-1 and corresponding antenna elements A12, A13, A14, and A15 assigned for use by base station 120-2. Accordingly, via the antenna interface 132-1, the instantiated base station 120-1 is able to transmit to and receive communications from communication devices in wireless coverage region 160-1 (between 0 and 180 degrees).

Further in this example embodiment, the base station controller 140 selects a second grouping of antenna elements A51, A61, and A62 of antenna hardware 150 to provide connectivity to communication devices 385-2 in a second wireless coverage region 160-2 in the network environment 100; the base station controller hardware 140 assigns the second grouping of antenna elements A51, A61, and A62 and antenna interface 132-2 to base station 120-2 to enable the base station 120-2 to communicate with the communication devices 385-2 in the second wireless coverage region 160-2 (second sector).

Instantiation of the antenna interface 132-2 (one or more resources in radio communication hardware 130) as specified by the base station controller hardware 140 provides hardware connectivity between instantiated base station 120-2 and corresponding antenna elements A51, A61, and A62 assigned for use by base station 120-2. Accordingly, via the antenna interface 132-2, the base station 120-2 is able to transmit to and receive communications from communication devices in wireless coverage region 160-2 (between 180 and 270 degrees).

Further in this example embodiment, the base station controller 140 selects a third grouping of antenna elements A56, A65, and A66 of antenna hardware 150 to provide connectivity to communication devices 385-3 in a third wireless coverage region 160-3 in the network environment 100; the base station controller hardware 140 assigns the third grouping of antenna elements A56, A65, and A66 and antenna interface 132-3 to the base station 120-3 to enable the base station 120-3 to communicate with the communication devices 385-3 in the third wireless coverage region 160-3 (third sector).

Instantiation of the antenna interface 132-3 (one or more resources in radio communication hardware 130) as specified by the base station controller hardware 140 provides hardware connectivity between base station 120-3 and corresponding antenna elements A56, A65, and A66 assigned for use by base station 120-3. Accordingly, via the antenna interface 132-3, the instantiated base station 120-3 is able to transmit to and receive communications from communication devices in wireless coverage region 160-3 (between 270 and 360 degrees).

In addition to selecting antenna elements and different regions of wireless coverage, the base station controller hardware 140 as discussed herein can be configured to select additional operating parameters such as one or more carrier frequencies to be used by each of the instantiated base stations 120. The carrier frequencies can be selected from a group of available carrier frequencies CF1, CF2, CF3, CF4, etc. As previously discussed, the carrier frequencies can be defined to support LTE or other communications over the CBRS band or any other suitable band.

For example, in one embodiment, via configuration settings 110-1, the base station controller hardware 140 generates configuration settings 110-1 to indicate a first (virtual) base station 120-1 in the radio communication hardware 150 to wirelessly communicate from a first group of the antenna elements A12, A13, A14, and A15 using allocated carrier frequency CF1 and at a transmit level of 100% of a maximum possible power level; the base station controller hardware 140 generates configuration settings 110-1 to indicate a second (virtual) base station 120-2 in the radio communication hardware 150 to wirelessly communicate from a second group of the antenna elements A51, A61, and A62 using allocated carrier frequency CF2 and at a transmit level of 100% of a maximum possible power level; the base station controller hardware 140 generates configuration settings 110-1 to indicate a third (virtual) base station 120-3 in the radio communication hardware 150 to wirelessly communicate from a third group of the antenna elements A56, A65, and A66 using allocated carrier frequency CF3 and at a transmit level of 75% of a maximum possible power level.

In one embodiment, the maximum possible power level is defined by a communication standard that sets the limit. In one embodiment, the maximum power level is 47 dBm per 10 MHz (Megahertz) of wireless coverage.

Note that the base station controller hardware 140 can be configured to assign a less than maximum power level to a base station (such as base station 120-3 in this instance) in order to avoid or reduce interference with other base stations and communication devices in a particular direction (such as between 270 and 360 degrees).

Note again that as an alternative to assigning different carrier frequencies to each base station, further embodiments herein include assigning the same one or more carrier frequencies for use in situations where the wireless coverage regions are generally non-overlapping.

Figure 3:
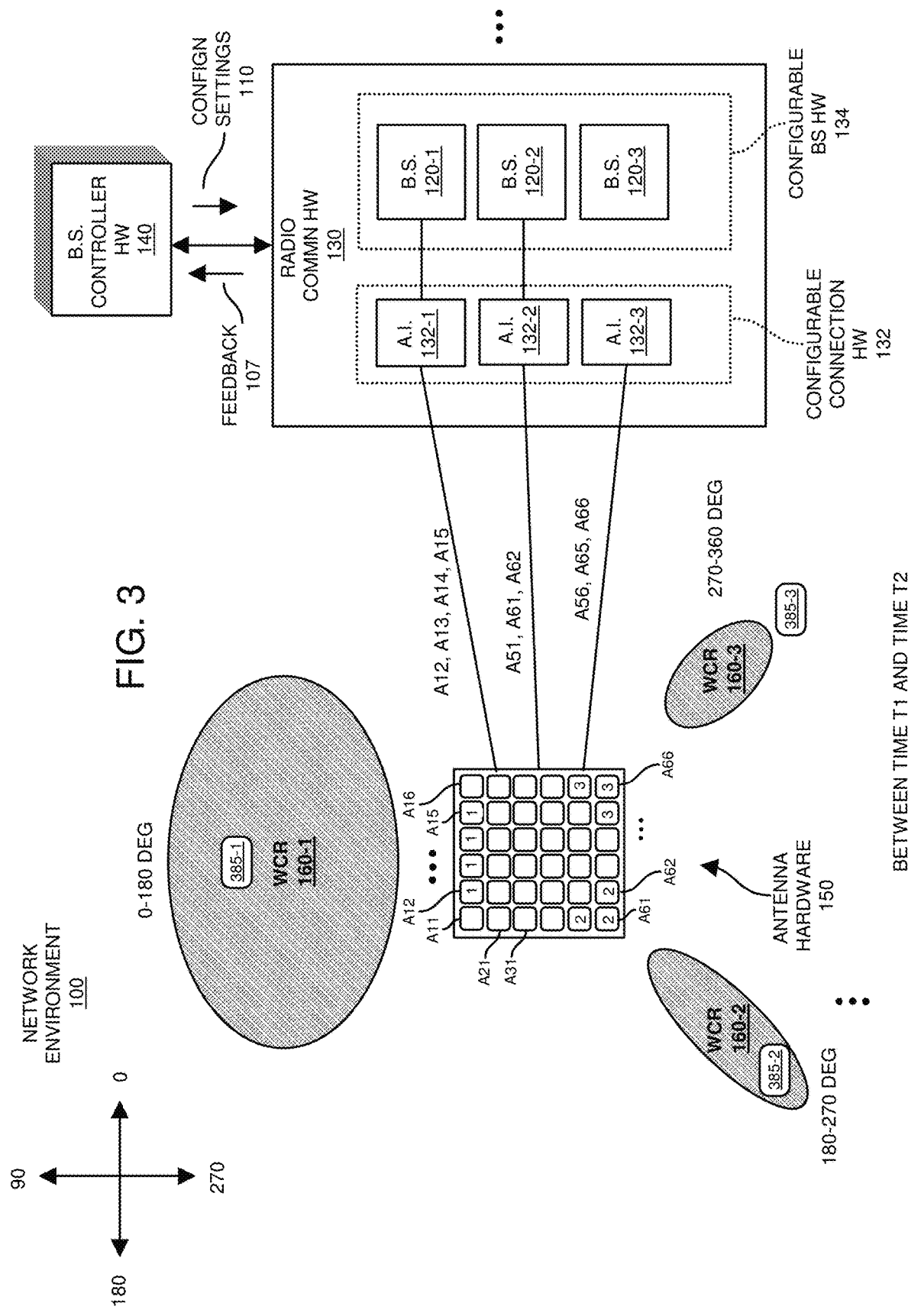
FIG. 3 is an example diagram illustrating a first implementation of a configurable wireless network according to embodiments herein.

FIG. 3 is an example diagram illustrating a first implementation of a configurable wireless network according to embodiments herein.

Subsequent to generation of the configuration settings 110-1, at or around time T1, the base station controller hardware 140 or other suitable resource applies the configuration settings 110-1 to the radio communication hardware 130 to provide the allocated wireless coverage as specified by wireless coverage regions 160-1, 160-2, and 160-3 and corresponding sector coverage angles.

As previously discussed, the configuration settings 110-1 define physical connectivity between the base stations and different groupings of antenna elements.

In this example embodiment, in accordance with the configuration settings 110-1, the base station controller hardware 140 instantiates base station 120-1, base station 120-2, and base station 120-3 in the configurable base station hardware 134 of radio communication hardware 130 as indicated by the configuration settings 134. As previously discussed, the configuration settings 110-1 indicate the different resources (such as computer processor hardware, memory, software instructions, etc.) to be used to implement each of the (virtual) base stations.

Additionally, the base station controller hardware 140 or other suitable resource applies the configuration settings 110-1 to the configurable connection hardware 132 of the radio communication hardware 130 to provide the physical connectivity (as well as transmit/receive capability) between the base stations and assigned groupings of antenna elements in antenna hardware 150. For example, via instantiation of antenna interface 132-1 in configurable connection hardware 132, the base station 120-1 is able to transmit and receive wireless communications over assigned antenna elements A12, A13, A14, and A15; via instantiation of antenna interface 132-2 in configurable connection hardware 132, the base station 120-2 transmits and receives wireless communications over assigned antenna elements A51, A61, and A62; via instantiation of antenna interface 132-3 via configurable connection hardware 132, the base station 120-3 transmits and receives wireless communications over assigned antenna elements A56, A65, and A66.

In this manner, the base station controller hardware 140 and corresponding resources such as radio communication hardware 130 and antenna hardware 150 can be configured to support upstream and downstream communications. For example, assigned antenna elements A12, A13, A14, and A15 convert wireless signals received from communication devices 385-1 to electrical communication signals. The antenna interface 132-1 conveys the electrical communication signals (communications) to the base station 120-1. The base station 120-1 transmits the corresponding communications through network 190 to the appropriate destination.

In a reverse direction, the base station 120-1 receives communications from one or more resources in network 190. Via paths defined by the instantiated antenna interface 132-1, the base station 120-1 transmits the received communications to antenna elements A12, A13, A14, and A15 that convert the received communications into wireless signals transmitted in the wireless coverage region 160-1 to communication devices 385-1.

Other base stations, antenna interfaces, and antenna elements operate in a similar manner.

FIG. 4 is an example diagram illustrating generation of second configuration settings according to embodiments herein.

As previously discussed, conditions of a respective network environment can change over time. In accordance with further embodiments, to accommodate ever-changing network environment conditions (such as change in number of users, change in density of users in a wireless region, change in wireless bandwidth requirements, etc.), the base station controller hardware 140 redefines use of the radio communication hardware 130 and antenna hardware 150 to provide different wireless coverage in the network environment 100 depending on current network conditions as indicated by feedback 107. Thus, via the base station controller hardware, embodiments herein include: dynamically adjusting the configuration settings applied to the radio communication hardware to change a number of the multiple base stations instantiated by the radio communication hardware over time.

Assume that the feedback 107 indicates an increase in the number of mobile communication devices in the angular range between 0 and 180 degrees at or around time T2. In response to detecting a need to instantiate another base station, the base station controller hardware 140 generates configuration settings 110-2 to provide second wireless services to one or more (stationary or mobile) communication devices present in network environment 100.

For example, in one embodiment, prior to generating configuration settings 110-2, the base station controller hardware 140 determines how many base stations to instantiate in network environment 100. In this example embodiment, assume that the base station controller hardware 140 produces the configuration settings 110-2 to support four base stations, namely, base station 120-2, 120-3, 120-4, and 120-5. In this example embodiment, previous instantiated base station 120-1 is split into two new base stations 120-4 and 120-5.

In a similar manner as previously discussed, for each base station to be instantiated, the base station controller 140 selects an appropriate grouping of antenna elements in antenna hardware 150 to provide a corresponding group of communication devices connectivity to a remote network 190. The antenna elements in antenna hardware 150 are located at different physical position in an array. Controlling phases of driving an assigned grouping of antenna elements and controlling phases of received signals from the antenna elements enables a respective base station to transmit and receive wireless communications in a particular wireless coverage region.

More specifically, in this example embodiment, the base station controller 140 selects a grouping of antenna elements A15, A16, and A26 from the antenna hardware 150 to provide wireless connectivity to communication devices 585-4 in wireless coverage region 160-4 in the network environment 100; the base station controller hardware 140 assigns the grouping of antenna elements A15, A16, and A26 and corresponding antenna interface 132-4 to base station 120-4 to enable the base station 120-4 to communicate with the communication devices 585-4 in the wireless coverage region 160-4 (sector angle 0 to 90 degrees).

Instantiation of the antenna interface 132-4 (such as one or more resources in radio communication hardware 130) as specified by the base station controller hardware 140 provides hardware connectivity between the instantiated base station 120-4 and corresponding antenna elements A15, A16, and A26 assigned for use by base station 120-4. Accordingly, via the antenna interface 132-4, the instantiated base station 120-4 is able to transmit to and receive communications from communication devices 585-4 in wireless coverage region 160-4 (between 0 and 90 degrees).

Further in this example embodiment, the base station controller 140 selects a grouping of antenna elements A51, A61, and A62 of antenna hardware 150 to provide connectivity to communication devices 585-2 in a second wireless coverage region 160-2 in the network environment 100; the base station controller hardware 140 assigns the grouping of antenna elements A51, A61, and A62 and antenna interface 132-2 to base station 120-2 to enable the base station 120-2 to communicate with the communication devices 585-2 in the second wireless coverage region 160-2 (second sector).

The antenna interface 132-2 (one or more resources in radio communication hardware 130) as specified by the base station controller hardware 140 provides hardware connectivity between instantiated base station 120-2 and corresponding antenna elements A51, A61, and A62 assigned for use by base station 120-2. Accordingly, via the antenna interface 132-2, the base station 120-2 is able to transmit to and receive communications from communication devices 585-2 in wireless coverage region 160-2 (between 180 and 270 degrees).

Further in this example embodiment, the base station controller 140 selects a grouping of antenna elements A56, A65, and A66 of antenna hardware 150 to provide connectivity to communication devices 585-3 in a third wireless coverage region 160-3 in the network environment 100; the base station controller hardware 140 assigns the grouping of antenna elements A56, A65, and A66 and antenna interface 132-3 to the base station 120-3 to enable the base station 120-3 to communicate with the communication devices 585-3 in the third wireless coverage region 160-3 (third sector).

Instantiation of the antenna interface 132-3 (one or more resources in radio communication hardware 130) as specified by the base station controller hardware 140 provides hardware connectivity between base station 120-3 and corresponding antenna elements A56, A65, and A66 assigned for use by base station 120-3. Accordingly, via the antenna interface 132-3, the instantiated base station 120-3 is able to transmit to and receive communications from communication devices in wireless coverage region 160-3 (between 270 and 360 degrees).

Further in this example embodiment, the base station controller 140 selects grouping of antenna elements A11, A12, and A21 of antenna hardware 150 to provide connectivity to communication devices 585-5 in wireless coverage region 160-5 in the network environment 100; the base station controller hardware 140 assigns the grouping of antenna elements A11, A12, and A21 and antenna interface 132-5 to base station 120-5 to enable the base station 120-5 to communicate with the communication devices 585-5 in the wireless coverage region 160-5 (fifth sector).

Instantiation of the antenna interface 132-5 (one or more resources in radio communication hardware 130) as specified by the base station controller hardware 140 provides hardware connectivity between instantiated base station 120-5 and corresponding antenna elements A11, A12, and A21 assigned for use by base station 120-2. Accordingly, via the antenna interface 132-5, the base station 120-5 is able to transmit to and receive communications from communication devices in wireless coverage region 160-5 (between 90 and 180 degrees).

In addition to selecting antenna elements and different regions of wireless coverage, the base station controller hardware 140 as discussed herein can be configured to select additional operating parameters such as one or more carrier frequencies to be used by each of the instantiated base stations 120. The carrier frequencies can be selected from a group of available carrier frequencies CF1, CF2, CF3, CF4, etc.

As previously discussed, the base station controller hardware 140 can be configured to assign a less than maximum power level to a base station (such as base station 120-3 in this instance) in order to avoid or reduce interference with other base stations and communication devices in a particular direction (such as between 270 and 360 degrees).

Figure 5:
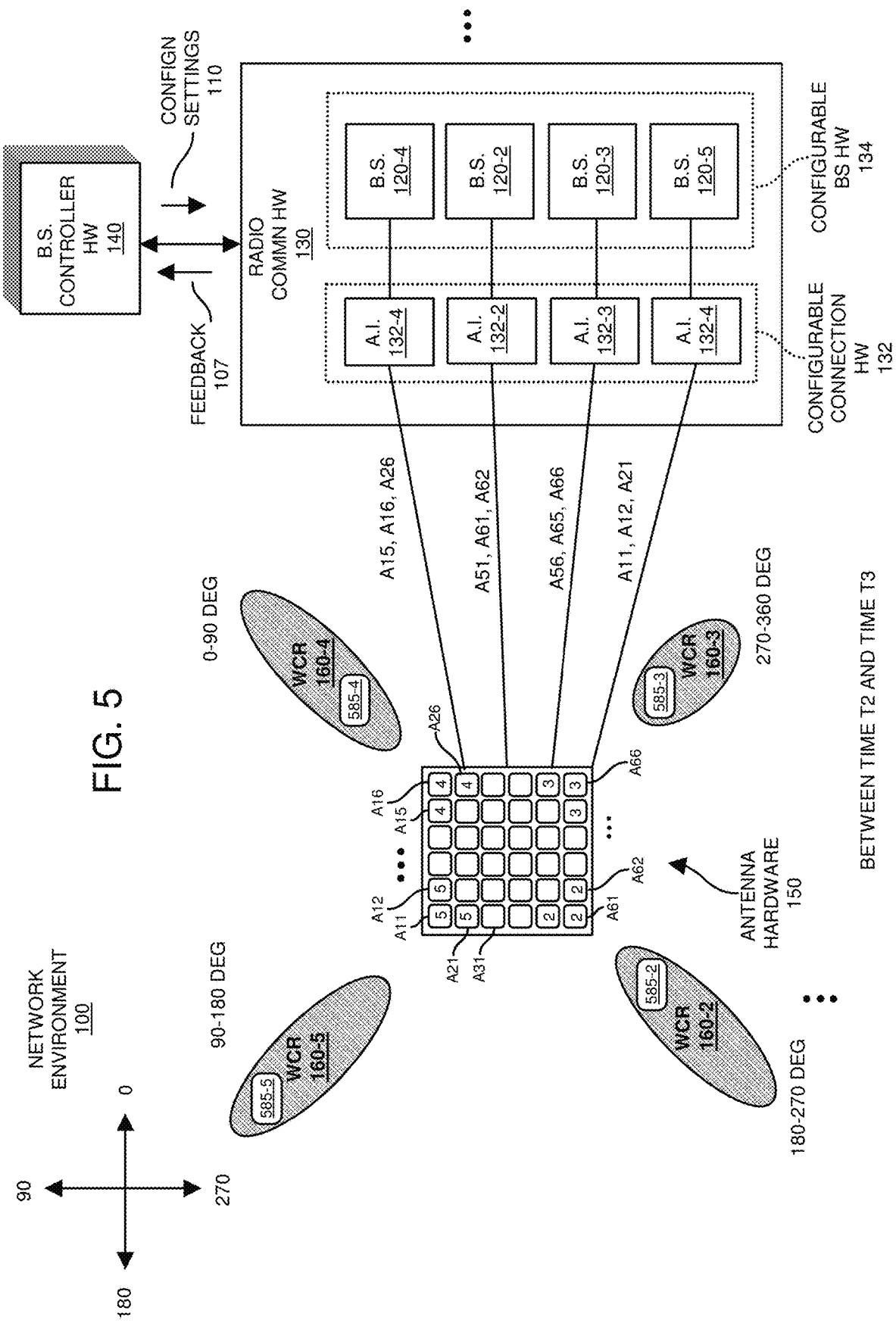
FIG. 5 is an example diagram illustrating a second implementation of a configurable wireless network according to embodiments herein.

FIG. 5 is an example diagram illustrating a second implementation of a configurable wireless network according to embodiments herein.

Subsequent to generation of the configuration settings 110-2, at or around time T2, the base station controller hardware 140 or other suitable resource applies the configuration settings 110-2 to the radio communication hardware 130 to provide the allocated wireless coverage as specified by wireless coverage regions 160-2, 160-3, 160-4, and 160-5 and sector coverage angles.

As previously discussed, the configuration settings 110-2 define physical connectivity between the base stations and different groupings of antenna elements.

In this example embodiment, in accordance with the configuration settings 110-2, the base station controller hardware 140 instantiates base station 120-2, base station 120-3, base station 120-4, and base station 120-5 in the configurable base station hardware 134 of radio communication hardware 130 as indicated by the configuration settings 110-2. As previously discussed, the configuration settings 110-2 indicate the different resources (such as computer processor hardware, memory, software instructions, etc.) to be used to implement each of the (virtual) base stations.

Additionally, the base station controller hardware 140 or other suitable resource applies the configuration settings 110-2 to the configurable connection hardware 132 of the radio communication hardware 130 to provide the physical connectivity (as well as transmit/receive capability) between the base stations and assigned groupings of antenna elements in antenna hardware 150.

For example, via instantiation of antenna interface 132-2 in configurable connection hardware 132, the base station 120-2 transmits and receives wireless communications over assigned antenna elements A51, A61, and A62; via instantiation of antenna interface 132-3 via configurable connection hardware 132, the base station 120-3 transmits and receives wireless communications over assigned antenna elements A56, A65, and A66; via instantiation of antenna interface 132-4 via configurable connection hardware 132, the base station 120-4 transmits and receives wireless communications over assigned antenna elements A15, A16, and A26; via instantiation of antenna interface 132-5 in configurable connection hardware 132, the base station 120-5 is able to transmit and receive wireless communications over assigned antenna elements A11, A12, and A21.

FIG. 6 is an example diagram illustrating generation of third configuration settings according to embodiments herein.

As previously discussed, conditions of a respective network environment can change over time. In accordance with further embodiments, to accommodate ever-changing network environment conditions (such as change in number of users, change in density of users in a wireless region, change in wireless bandwidth requirements, etc.), the base station controller hardware 140 redefines use of the radio communication hardware 130 and antenna hardware 150 to provide different wireless coverage in the network environment 100 depending on current network conditions as indicated by feedback 107.

Assume that the feedback 107 indicates a decrease in the number of mobile communication devices or wireless bandwidth needed in the angular range between 90 and 270 degrees. At or around time T3, in response to detecting a need to consolidate base stations 120-2 and 120-5, the base station controller hardware 140 generates configuration settings 110-3 to provide third wireless services to one or more (stationary or mobile) communication devices present in network environment 100.

For example, in one embodiment, prior to generating configuration settings 110-3, the base station controller hardware 140 determines how many base stations to instantiate in network environment 100. In this example embodiment, assume that the base station controller hardware 140 produces the configuration settings 110-3 to support three base stations, namely, base station 120-3, 120-4, and 120-6. As mentioned, the prior instantiated base stations 120-2 and 120-5 are consolidated into base station 120-6.

In a similar manner as previously discussed, for each base station to be instantiated, the base station controller 140 selects an appropriate grouping of antenna elements in antenna hardware 150 to provide a corresponding group of communication devices connectivity to a remote network 190. In one embodiment, the antenna elements in antenna hardware 150 are located at different physical positions in an array. Controlling phases of driving an assigned grouping of antenna elements and controlling phases of received signs from the antenna elements enables a respective base station to transmit and receive wireless communications in a particular wireless coverage region.

More specifically, in this example embodiment, the base station controller 140 selects a grouping of antenna elements A15, A16, and A26 from the antenna hardware 150 to provide wireless connectivity to communication devices 785-4 in wireless coverage region 160-4 in the network environment 100; the base station controller hardware 140 assigns the grouping of antenna elements A15, A16, and A26 and corresponding antenna interface 132-4 to base station 120-4 to enable the base station 120-4 to communicate with the communication devices 785-4 in the wireless coverage region 160-4 (sector angle 0 to 90 degrees).

The antenna interface 132-4 and its corresponding attributes (such as one or more resources in radio communication hardware 130) as specified by the base station controller hardware 140 provides hardware connectivity between the instantiated base station 120-4 and corresponding antenna elements A15, A16, and A26 assigned for use by base station 120-4. Accordingly, via the antenna interface 132-4, the instantiated base station 120-4 is able to transmit to and receive communications from communication devices 785-4 in wireless coverage region 160-4 (between 0 and 90 degrees).

Further in this example embodiment, the base station controller 140 selects a grouping of antenna elements A56, A65, and A66 of antenna hardware 150 to provide connectivity to communication devices 785-3 in a third wireless coverage region 160-3 in the network environment 100; the base station controller hardware 140 assigns the grouping of antenna elements A56, A65, and A66 and antenna interface 132-3 to the base station 120-3 to enable the base station 120-3 to communicate with the communication devices 785-3 in the third wireless coverage region 160-3 (third sector).

Instantiation of the antenna interface 132-3 (one or more resources in radio communication hardware 130) as specified by the base station controller hardware 140 provides hardware connectivity between base station 120-3 and corresponding antenna elements A56, A65, and A66 assigned for use by base station 120-3. Accordingly, via the antenna interface 132-3, the instantiated base station 120-3 is able to transmit to and receive communications from communication devices 785-3 in wireless coverage region 160-3 (between 270 and 360 degrees).

Further in this example embodiment, the base station controller 140 selects a grouping of antenna elements A21, A31, A41, and A51 of antenna hardware 150 to provide connectivity to communication devices 785-6 in wireless coverage region 160-6 in the network environment 100; the base station controller hardware 140 assigns the grouping of antenna elements A21, A31, A41, and A51 and antenna interface 132-6 to base station 120-6 to enable the base station 120-6 to communicate with the communication devices 785-6 in the wireless coverage region 160-6 (sixth sector).

Instantiation of the antenna interface 132-6 (one or more resources in radio communication hardware 130) as specified by the base station controller hardware 140 provides hardware connectivity between instantiated base station 120-6 and corresponding antenna elements A21, A31, A41, and A51 assigned for use by base station 120-6. Accordingly, via the antenna interface 132-6, the base station 120-6 is able to transmit to and receive communications from communication devices 785-6 in wireless coverage region 160-6 (between 90 and 270 degrees).

In addition to selecting antenna elements and different regions of wireless coverage, the base station controller hardware 140 as discussed herein can be configured to select additional operating parameters such as one or more carrier frequencies to be used by each of the instantiated base stations 120. The carrier frequencies can be selected from a group of available carrier frequencies CF1, CF2, CF3, CF4, etc.

As previously discussed, the base station controller hardware 140 can be configured to assign a less than maximum power level to a base station (such as base station 120-3 in this instance) in order to avoid or reduce interference with other base stations and communication devices in a particular direction (such as between 270 and 360 degrees).

Figure 7:
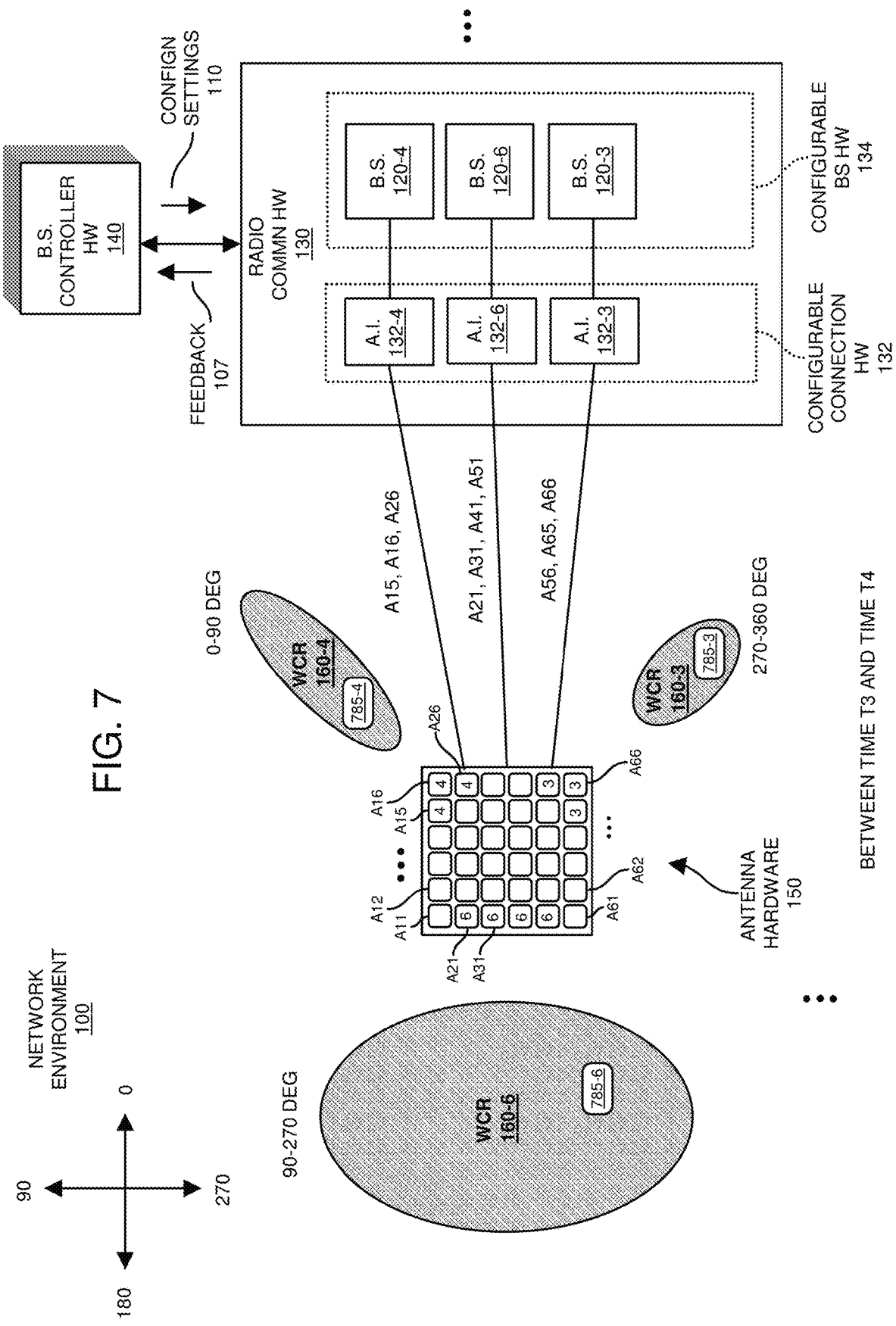
FIG. 7 is an example diagram illustrating a third implementation of a configurable wireless network according to embodiments herein.

FIG. 7 is an example diagram illustrating a third implementation of a configurable wireless network according to embodiments herein.

Subsequent to generation of the configuration settings 110-3, at or around time T3, the base station controller hardware 140 or other suitable resource applies the configuration settings 110-3 to the radio communication hardware 130 to provide the allocated wireless coverage as specified by wireless coverage regions 160-3, 160-4, and 160-6 and sector coverage angles.

As previously discussed, the configuration settings 110-3 define physical connectivity between the base stations and different groupings of antenna elements.

In this example embodiment, in accordance with the configuration settings 110-3, the base station controller hardware 140 instantiates base station 120-3, base station 120-4, and base station 120-6 in the configurable base station hardware 134 of radio communication hardware 130 as indicated by the configuration settings 110-3. As previously discussed, the configuration settings 110-3 indicate the different resource (such as computer processor hardware, memory, software instructions, etc.) to be used to implement each of the (virtual) base stations.

Additionally, the base station controller hardware 140 or other suitable resource applies the configuration settings 110-3 to the configurable connection hardware 132 of the radio communication hardware 130 to provide the physical connectivity (as well as transmit/receive capability) between the base stations and assigned groupings of antenna elements in antenna hardware 150.

For example, via instantiation of antenna interface 132-3 in configurable connection hardware 132, the base station 120-2 transmits and receives wireless communications over assigned antenna elements A56, A65, and A66; via instantiation of antenna interface 132-4 via configurable connection hardware 132, the base station 120-4 transmits and receives wireless communications over assigned antenna elements A15, A16, and A26; via instantiation of antenna interface 132-6 via configurable connection hardware 132, the base station 120-6 transmits and receives wireless communications over assigned antenna elements A21, A31, A41, and A51.

Figure 8:
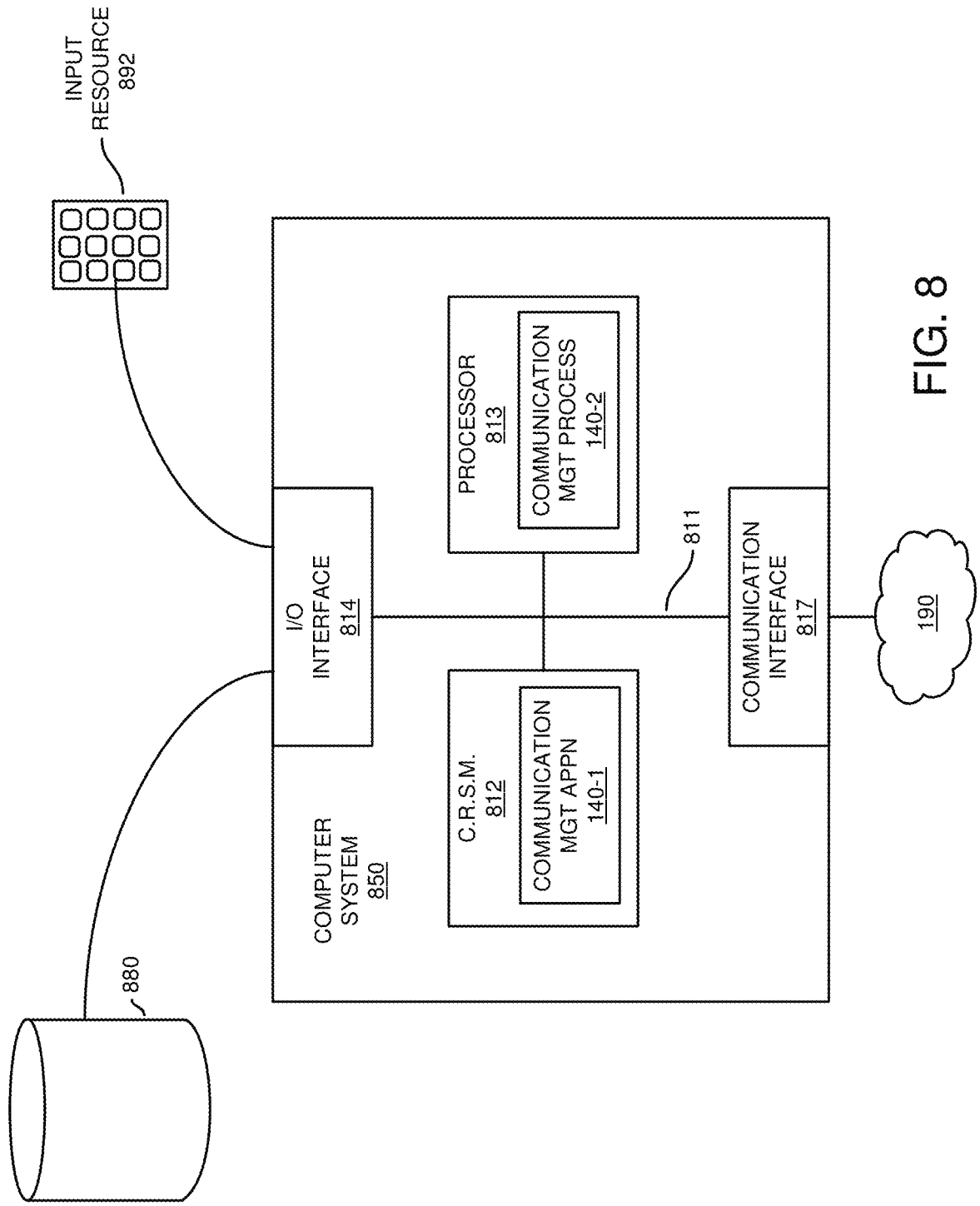
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as base station controller hardware 140, radio communication hardware 130, configurable connection hardware 132, configurable base station harder 134, antenna hardware 150, one or more communication devices, etc.) as discussed herein can be configured to include computer processor hardware and/or corresponding executable instructions to carry out the different operations as discussed herein.

As shown, computer system 850 of the present example includes an interconnect 811 that couples computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with communication management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 540-1 stored on computer readable storage medium 812. Execution of the communication management application 140-1 produces communication management process 140-2 to carry out any of the operations and/or processes as discussed herein.

Those skilled in the art will understand that the computer system 850 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 9-10. Note that the steps in the flowcharts below can be executed in any suitable order.

Figure 9:
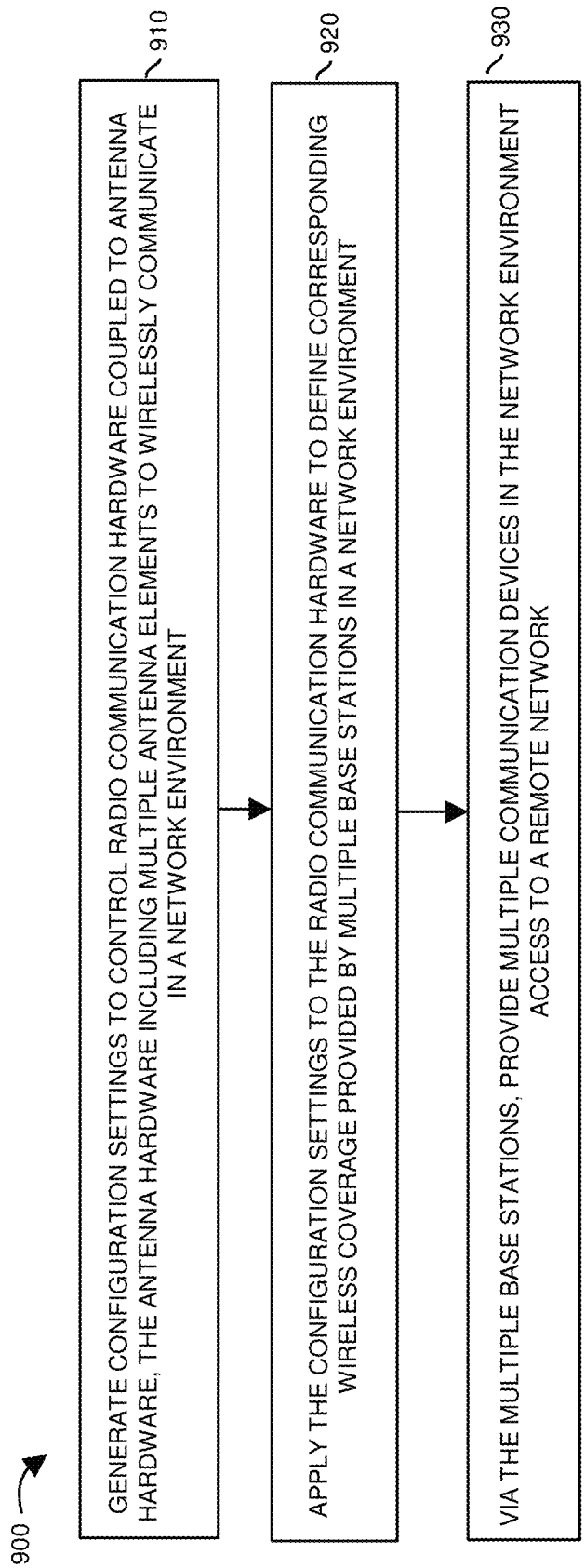
FIGS. 9-10 are example diagrams illustrating methods according to embodiments herein.

FIG. 9 is a flowchart 900 illustrating an example method according to embodiments. Note that there will be some overlap with respect to concepts as discussed above.

In processing operation 910, the base station controller hardware 140 (such as via execution of communication management application 140-1) generates configuration settings 110 to control radio communication hardware 130 coupled to antenna hardware 150. The antenna hardware 150 includes multiple antenna elements (such as A11, A12, . . . , A21, A22, . . . ) to wirelessly communicate in network environment 100.

In processing operation 920, the base station controller hardware 140 applies the configuration settings 110 to the radio communication hardware 130 to define instantiation of the multiple base stations 120 and corresponding wireless coverage 160 provided by each of multiple base stations 120 in network environment 100.

In processing operation 930, the multiple base stations 120 instantiated by the base station controller hardware 140 in the radio communication hardware 130 provide multiple communication devices in the network environment access to a remote network 190. As previously discussed, in one embodiment, the configuration settings 110 indicate settings to apply to the configurable base station harder 134 to instantiate corresponding (virtual) base stations 120. Additionally, the configuration settings 110 indicate settings to apply to the configurable connection hardware 132 to instantiate corresponding antenna interfaces (132-1, 132-2, etc.), providing control/communication paths between the base stations and groupings of antenna elements.

Figure 10:
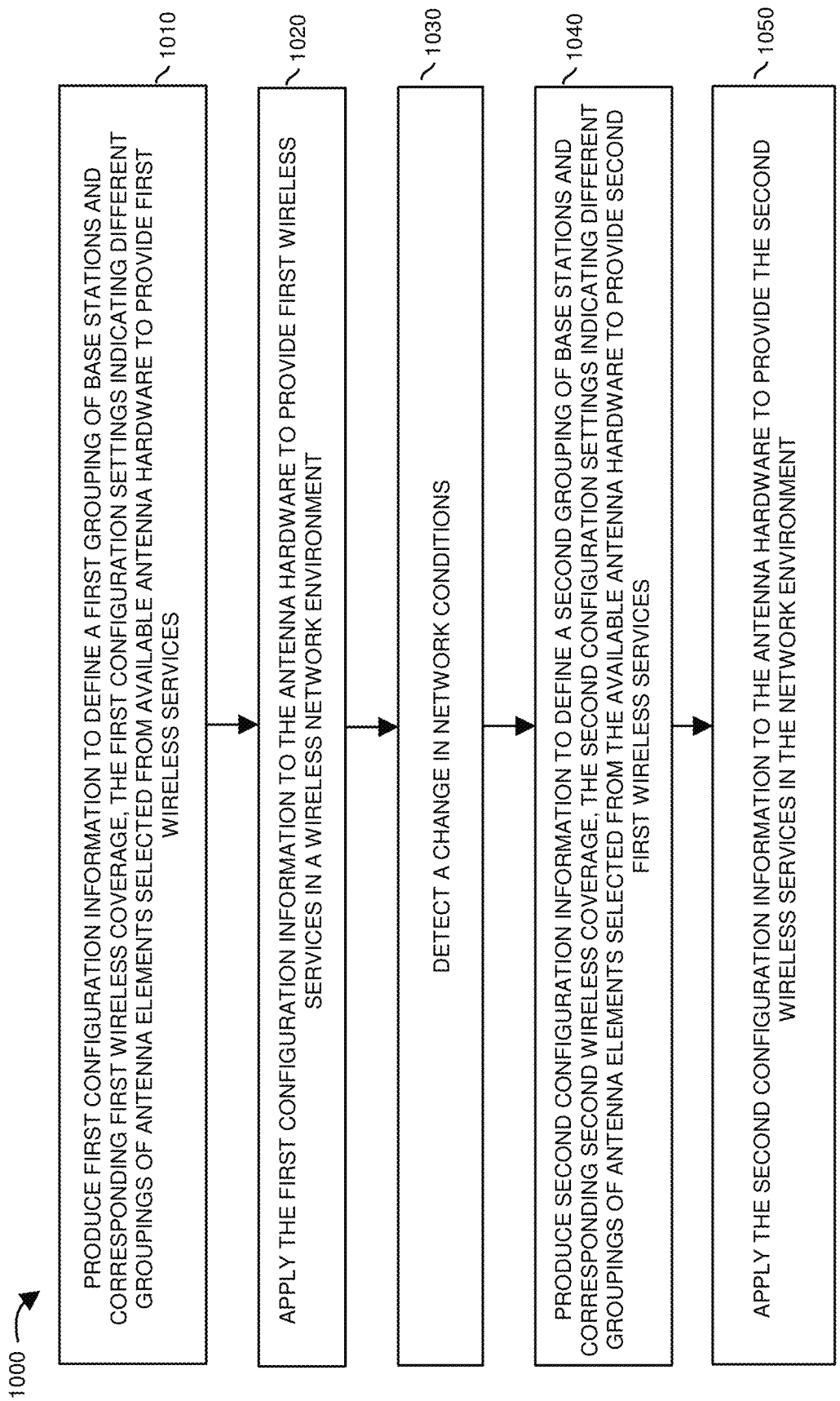

FIG. 10 is a flowchart 1000 illustrating an example method according to embodiments. Note that there will be some overlap with respect to concepts as discussed above.

In processing operation 1010, the base station controller hardware 140 produces first configuration settings 110-1 (configuration information) to define a first grouping of base stations 120 (such as base stations 120-1, 120-2, and 120-3) and corresponding first wireless coverage 160 (such as wireless coverage 160-1, 160-2, and 160-3). The first configuration settings 110-1 indicate different groupings of antenna elements selected from available antenna hardware 150 to provide first wireless services.

In processing operation 1020, the base station controller hardware 140 applies the first configuration settings 110-1 to the antenna hardware 150 to provide the first wireless services in the wireless network environment 100.

In processing operation, the base station controller hardware 140 detects a change in network conditions such as based on feedback 107. Feedback 107 can be received from any suitable resource such as base stations 120, communication devices, etc.

In processing operation 1040, the base station controller hardware 140 produces second configuration settings 110-2 to define a second grouping of base stations 120 (such as base station 120-2, 120-3, 120-4, and 120-5) and corresponding second wireless coverage 160 (such as wireless coverage 160-2, 160-3, 160-4, and 160-5). The second configuration settings 110-2 indicate different groupings of antenna elements selected from the available antenna hardware 150 to provide the second wireless services.

In processing operation 1050, the base station controller hardware 140 applies the second configuration settings 110-2 to the antenna hardware 150 to provide the second wireless services in the network environment 100.

As an example of this embodiment, with reference back to FIG. 3 and corresponding configuration settings 110-2 in FIG. 2, the base station controller hardware 140 is operable to produce first configuration settings 110-1 (configuration information) to define a first grouping of base stations and corresponding first wireless coverage; the first configuration settings 110-1 indicate different groupings of antenna elements selected from available antenna hardware 150 to provide first wireless services. As previously discussed, in accordance with the configuration settings 110-2, the radio communication hardware 130 and antenna hardware 150 applies the first configuration information to provide the first wireless services in the wireless network environment 100.

In response to detecting a change in network conditions based on feedback 107 such as indicating an increased number of mobile communication devices in a wireless network environment 100, to accommodate the increased number of mobile communication devices, the base station controller hardware 140 produces second configuration information 110-2 (FIG. 4) to define a second grouping of base stations and corresponding second wireless coverage; the second configuration settings indicate different groupings of antenna elements selected from the available antenna hardware to provide second wireless services (FIG. 5). The radio communication hardware 130 and antenna hardware 150 apply the second configuration information 110-2 to provide the second wireless services in the network environment.

In one embodiment, the first grouping of base stations (base station 120-1, 120-2, 120-3) in configuration settings 110-1 (FIG. 2) specifies a different number of base stations than the second grouping of base stations (120-2, 120-3, 120-4, 120-5) in configuration settings 110-2 (FIG. 4). The first wireless coverage provided by configuration settings 110-1 is different than the second wireless coverage provided by configuration settings 110-2.

FIG. 11 is an example diagram illustrating a transceiver (transmitter-receiver) interface according to embodiments herein.

In this example embodiment, in accordance with configuration settings 110-1 of FIG. 2, the base station 120-1 is assigned use of antenna elements A12, A13, A14, and A15.

In one embodiment, the configurable connection hardware 132 includes a transmitter interface and a receiver interface coupled to each antenna element. Via configurable connection hardware 132, each antenna element can be assigned for use by any of the respective base stations.

More specifically, antenna element A11 is coupled to transmitter interface 360-11 and receiver interface 370-11 of configurable connection hardware 132. Transmitter interface 360-11 drives antenna element A11 to transmit a wireless signal; antenna element A11 converts received wireless signals into electrical signals conveyed to receiver interface 370-11.

Antenna element A12 is coupled to transmitter interface 360-12 and receiver interface 370-12 of configurable connection hardware 132. Transmitter interface 360-12 drives antenna element A12 to transmit a wireless signal; antenna element A12 converts received wireless signals into electrical signals conveyed to receiver interface 370-12.

Antenna element A13 is coupled to transmitter interface 360-13 and receiver interface 370-13 of configurable connection hardware 132. Transmitter interface 360-13 drives antenna element A13 to transmit a wireless signal; antenna element A13 converts received wireless signals into electrical signals conveyed to receiver interface 370-13.

Antenna element A14 is coupled to transmitter interface 360-14 and receiver interface 370-14 of configurable connection hardware 132. Transmitter interface 360-14 drives antenna element A14 to transmit a wireless signal; antenna element A14 converts received wireless signals into electrical signals conveyed to receiver interface 370-14.

Antenna element A15 is coupled to transmitter interface 360-15 and receiver interface 370-15 of configurable connection hardware 132. Transmitter interface 360-15 drives antenna element A15 to transmit a wireless signal; antenna element A15 converts received wireless signals into electrical signals conveyed to receiver interface 370-15. Antenna element A16 is coupled to transmitter interface 360-16 and receiver interface 370-16 of configurable connection hardware 132. Transmitter interface 360-16 drives antenna element A16 to transmit a wireless signal; antenna element A16 converts received wireless signals into electrical signals conveyed to receiver interface 370-16.

In a similar manner, each antenna element is coupled to a corresponding transmitter interface/receiver interface.

As previously discussed, each antenna element can be dynamically assigned for use by any instantiated base station. In this example embodiment, such as based on FIGS. 2 and 3 and corresponding configuration settings 110-1, the base station 120-1 in FIG. 11 is assigned use of antenna elements A12, A13, A14, and A15. Antenna interface 132-1 is assigned (as indicated by configuration settings 110-1) to provide connectivity of the instantiated base station 120-1 to the corresponding antenna elements A12, A13, A14, and A15 as shown in FIG. 11. Via connectivity provided by antenna interface 132-1, and corresponding circuitry such as transmitter interface 360-12, 360-13, 360-14, etc., 370-12, 370-13, 370-14, etc.), the base station 120-1 is able to transmit and receive wireless communications using antenna elements A12, A13, A14, and A15. As previously discussed, phases of received and transmitted signals are controlled to provide directivity of the generated/received wireless signals in the respective wireless coverage region 160-1.

Note again that techniques herein are well suited to facilitate dynamic implementation of base stations, antenna elements, and allocation of wireless bandwidth in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A system comprising:
   antenna hardware including multiple antenna elements to wirelessly communicate in a network environment;
   radio communication hardware coupled to the antenna hardware, the radio communication hardware including multiple wireless base stations in communication with a remote network; and
   a controller operable to:
   receive first configuration settings defining signal path connectivity between the multiple wireless base stations and the antenna hardware;
   implement the first configuration settings, implementation of the first configuration settings connecting the multiple wireless base stations to antenna elements of the antenna hardware via the signal path connectivity as specified by the first configuration settings; and
   via the multiple wireless base stations and the antenna hardware, providing multiple communication devices in the network environment access to a remote network;
   wherein the first configuration settings indicate a first set of antenna elements of the antenna hardware assigned to a first wireless base station, a first antenna element of the antenna elements included in the first set, the controller further operative to:
   receive second configuration settings, the second configuration settings specifying a second set of antenna elements of the antenna hardware assigned to a second wireless base station, the first antenna element included in the second set;
   for a first time duration associated with the first configuration settings, applying the first configuration settings to configurable connection hardware to produce first signal path connectivity between the first wireless base station and the antenna elements in the first set; and
   in accordance with the second configuration settings associated with a second time duration following the first time duration: i) terminate the first signal path connectivity, and ii) apply the second configuration settings to the configurable connection hardware to produce second signal path connectivity between the second wireless base station and the antenna elements in the second set;
   wherein first communications from the first wireless base station over the first signal path connectivity and the first set of antenna elements including the first antenna element provides a first angular beam width with respect to the antenna hardware; and
   wherein second communications from the second wireless base station over the second signal path connectivity and the second set of antenna elements including the first antenna element provides a second angular beam width with respect to the antenna hardware.

2. The system as in claim 1, wherein the first configuration settings specify different wireless power levels at which the first wireless base station and the second wireless base station are controlled to transmit wireless signals from the antenna hardware.

3. The system as in claim 1, wherein the first configuration settings indicate a first wireless transmit power level at which a first less-than-all portion of the antenna elements transmit first wireless signals generated by the first wireless base station; and
   wherein the first configuration settings indicate a second wireless transmit power level at which a second less-than-all portion of the antenna elements transmit second wireless signals generated by the second wireless base station.

4. The system as in claim 1 further comprising:
   the configurable connection hardware disposed between the radio communication hardware and the antenna hardware, the configurable connection hardware operative to provide the selected connectivity between the multiple wireless base stations and the antenna hardware.

5. The system as in claim 1, wherein the second set of antenna elements includes fewer antenna elements than the first set of antenna elements.

6. The system as in claim 1, wherein the first set of antenna elements provides wireless communications in a first outward direction from the antenna hardware; and
   wherein the second set of antenna elements provides wireless communications in a second outward direction from the antenna hardware.

7. The system as in claim 1, wherein the controller is operative to implement second configuration settings instead of the first configuration settings in response to detecting a change in network conditions of communicating from the antenna hardware to the multiple mobile communication devices.

8. A method comprising:
   receiving first configuration settings defining signal path connectivity between multiple wireless base stations and antenna hardware;
   implementing the first configuration settings, implementation of the first configuration settings connecting the multiple wireless base stations to antenna elements of the antenna hardware via the signal path connectivity as specified by the first configuration settings; and
   via the multiple wireless base stations and the antenna hardware, providing multiple communication devices in the network environment access to a remote network;

wherein the first configuration settings indicate a first set of antenna elements of the antenna hardware assigned to a first wireless base station, a first antenna element of the antenna elements included in the first set, the method further comprising:
receiving second configuration settings, the second configuration settings specifying a second set of antenna elements of the antenna hardware assigned to a second wireless base station, the first antenna element included in the second set;
for a first time duration associated with the first configuration settings, applying the first configuration settings to configurable connection hardware to produce first signal path connectivity between the first wireless base station and the antenna elements in the first set; and
in accordance with the second configuration settings associated with a second time duration following the first time duration: i) terminating the first signal path connectivity, and ii) applying the second configuration settings to the configurable connection hardware to produce second signal path connectivity between the second wireless base station and the antenna elements in the second set;
wherein first communications from the first wireless base station over the first signal path connectivity and the first set of antenna elements including the first antenna element provides a first angular beam width with respect to the antenna hardware; and
wherein second communications from the second wireless base station over the second signal path connectivity and the second set of antenna elements including the first antenna element provides a second angular beam width with respect to the antenna hardware.

9. The method as in claim 8,
wherein the first configuration settings specify different wireless power levels at which the first wireless base station and the second wireless base station are assigned to transmit wireless signals from the antenna hardware.

10. The method as in claim 8, wherein the first configuration settings indicate a first wireless transmit power level at which the first set of antenna elements of the antenna hardware are assigned to transmit first wireless signals generated by the first wireless base station of the multiple wireless base stations; and
wherein the second configuration settings indicate a second wireless transmit power level at which the second set of antenna elements of the antenna hardware are assigned to transmit second wireless signals generated by the second wireless base station of the multiple wireless base stations.

11. The method as in claim 8, wherein the second set of antenna elements includes fewer antenna elements than the first set of antenna elements.

12. The method as in claim 8, further comprising:
via the set of antenna elements, supporting wireless communications in a first outward direction from the antenna hardware; and
via the second set antenna elements, supporting wireless communications in a second outward direction from the antenna hardware.

13. The method as in claim 8 further comprising:
implementing the second configuration settings instead of the first configuration settings in response to detecting a change in network conditions of communicating from the antenna hardware to the multiple mobile communication devices.

14. The method as in claim 8, wherein the antenna hardware is a multi-dimensional array of the antenna elements.

15. The method as in claim 8 further comprising:
wherein the second configuration settings are generated as a the replacement to the first configuration settings in response to feedback of implementing the first configuration settings.

16. The method as in claim 8, wherein the first set of antenna elements includes a second antenna element of the antenna hardware;
wherein the second set of antenna elements includes the first antenna element; and
wherein the second configuration settings indicate a third set of antenna elements of the antenna hardware assigned to a third wireless base station of the multiple base stations, the second antenna element included in the third set.

17. Computer-readable storage hardware having instructions stored thereon, the instructions, when carried out by computer processor hardware, cause the computer processor hardware to:
receive first configuration settings defining signal path connectivity between multiple wireless base stations and antenna hardware;
implement the first configuration settings, implementation of the first configuration settings connecting the multiple wireless base stations to antenna elements of the antenna hardware via the signal path connectivity as specified by the first configuration settings; and
via the multiple wireless base stations and the antenna hardware, provide multiple communication devices in the network environment access to a remote network;
wherein the multiple wireless base stations include a first wireless base station and a second wireless base station;
wherein the first configuration settings specify: i) a first less-than-all portion of the multiple antenna elements assigned to the first wireless base station, and ii) a second less-than-all portion of the antenna elements assigned to the second wireless base station;
wherein implementation of the first configuration settings includes: establishment of first signal path connectivity configurable connection hardware, the established first signal path connectivity extending between the first wireless base station and the first less-than-all portion of the multiple antenna elements assigned to the first wireless base station; and establishment of second signal path connectivity in the configurable connection hardware, the established second signal path connectivity extending between the second wireless base station and the second less-than-all portion of the multiple antenna elements assigned to the second wireless base station;
wherein the first configuration settings specify a first wireless power level at which the first wireless base is assigned to wirelessly transmit first communications from the first less-than-all portion of the multiple antenna elements; and
wherein the first configuration settings specify a second wireless power level at which the second wireless base is assigned to wirelessly transmit second communications from the second less-than-all portion of the multiple antenna elements.

18. A method comprising:
receiving first configuration settings defining signal path connectivity between multiple wireless base stations and antenna hardware;

implementing the first configuration settings, implementation of the first configuration settings connecting the multiple wireless base stations to antenna elements of the antenna hardware via the signal path connectivity as specified by the first configuration settings; and via the multiple wireless base stations and the antenna hardware, providing multiple communication devices in the network environment access to a remote network;

wherein the multiple wireless base stations include a first wireless base station and a second wireless base station;

wherein the first configuration settings specify: i) a first less-than-all portion of the multiple antenna elements assigned to the first wireless base station, and ii) a second less-than-all portion of the antenna elements assigned to the second wireless base station;

wherein implementing the first configuration settings includes: establishing first signal path connectivity in configurable connection hardware, the established first signal path connectivity extending between the first wireless base station and the first less-than-all portion of the multiple antenna elements assigned to the first wireless base station; and establishing second signal path connectivity in the configurable connection hardware, the established second signal path connectivity extending between the second wireless base station and the second less-than-all portion of the multiple antenna elements assigned to the second wireless base station;

wherein the first configuration settings specify a first wireless power level at which the first wireless base is assigned to wirelessly transmit first communications from the first less-than-all portion of the multiple antenna elements; and wherein the first configuration settings specify a second wireless power level at which the second wireless base is assigned to wirelessly transmit second communications from the second less-than-all portion of the multiple antenna elements.

19. A method comprising:

receiving first configuration settings defining signal path connectivity between multiple wireless base stations and antenna hardware;

implementing the first configuration settings, implementation of the first conflagration settings connecting the multiple wireless base stations to antenna elements of the antenna hardware via the signal path connectivity as specified by the first configuration settings; and via the multiple wireless base stations and the antenna hardware, providing multiple communication devices in the network environment access to a remote network;

wherein the first configuration settings indicate a first set of antenna elements of the antenna hardware assigned to a first wireless base station, a first antenna element of the antenna elements included in the first set, the method further comprising:

receiving second configuration settings, the second configuration settings specifying a second set of antenna elements of the antenna hardware as assigned to a second wireless base station, the first antenna element included in the second set;

for a first time duration associated with the first configuration settings, applying the first configuration settings to configurable connection hardware to produce first signal path connectivity between the first wireless base station and the antenna elements in the first set; and in accordance with the sec and configuration settings associated with a second time duration following the first time duration: i) terminating the first signal path connectivity, and ii) applying the second configuration settings to the configurable connection hardware to produce second signal path connectivity between the second wireless base station and the antenna elements in the second set; and the method further comprising: controlling a power level of the first communications in accordance with a first power level as specified by the first configuration settings; and controlling a power level of the second communications in accordance with a second power level as specified by the second configuration settings, the second power level different than the first power level.

* * * * *

UNITED STATES PATENT AND TRADEMARK OFFICE
CERTIFICATE OF CORRECTION

PATENT NO. : 11,671,848 B2  
APPLICATION NO. : 17/203509  
DATED : June 6, 2023  
INVENTOR(S) : Hossam H. Hmimy Page 1 of 1

It is certified that error appears in the above-identified patent and that said Letters Patent is hereby corrected as shown below:

In the Claims

Claim 1, Line 21, replace ":" with --;--  
Claim 17, Line 25, replace "configurable" with --in configurable--  
Claim 19, Line 6, replace "conflagration" with --configuration--  
Claim 19, Line 21, remove "as"  
Claim 19, Line 29, replace "sec and" with --second--

Signed and Sealed this  
Twenty-second Day of August, 2023

Katherine Kelly Vidal  
*Director of the United States Patent and Trademark Office*